US006999483B1

(12) United States Patent
Yin

(10) Patent No.: US 6,999,483 B1
(45) Date of Patent: Feb. 14, 2006

(54) EXTERNAL 3RD, 4TH AND 5TH HARMONIC LASER

(75) Inventor: Yusong Yin, Stonybrook, NY (US)

(73) Assignee: Photonics Industries Int'l., Bohemia, NY (US)

( * ) Notice: Subject to any disclaimer, the term of this patent is extended or adjusted under 35 U.S.C. 154(b) by 266 days.

(21) Appl. No.: 10/603,265

(22) Filed: Jun. 24, 2003

Related U.S. Application Data

(63) Continuation-in-part of application No. 09/741,137, filed on Dec. 19, 2000, now Pat. No. 6,587,487.

(51) Int. Cl.
*H01S 3/10* (2006.01)

(52) U.S. Cl. .......................................... 372/22; 372/21

(58) Field of Classification Search ............. 372/21–23
See application file for complete search history.

(56) References Cited

U.S. PATENT DOCUMENTS 4,413,342 A * 11/1983 Cohen et al. ................. 372/22
5,278,852 A * 1/1994 Wu et al. ..................... 372/22
5,835,513 A 11/1998 Pieterse et al.
5,898,717 A * 4/1999 Yin ............................. 372/22
5,936,983 A * 8/1999 Yusong et al. ................ 372/22
5,943,351 A * 8/1999 Zhou et al. ................... 372/22
6,005,878 A * 12/1999 Kung et al. ................... 372/22
6,031,854 A * 2/2000 Ming .......................... 372/22
6,055,249 A * 4/2000 Masuda ....................... 372/22
6,061,370 A * 5/2000 Yin ............................. 372/22
6,097,742 A * 8/2000 Caprara et al. ............... 372/22
6,229,829 B1 * 5/2001 Yin ............................. 372/22
6,327,281 B1 * 12/2001 Yin ............................. 372/22
6,347,102 B1 * 2/2002 Konno et al. ................. 372/22
6,366,596 B1 * 4/2002 Yin et al. ..................... 372/92
6,580,054 B1 * 6/2003 Liu et al. ............... 219/121.68
6,584,134 B1 * 6/2003 Yin et al. ..................... 372/92
6,587,487 B1 * 7/2003 Yin ............................. 372/22
6,816,520 B1 * 11/2004 Tulloch et al. ................ 372/22
6,822,978 B1 * 11/2004 Kafka et al. .................. 372/18
2002/0080841 A1 * 6/2002 Yin et al. ..................... 372/75
2002/0114553 A1 * 8/2002 Mead et al. .................. 385/10

* cited by examiner

*Primary Examiner*—Minsun Oh Harvey
*Assistant Examiner*—Phillip Nguyen
(74) *Attorney, Agent, or Firm*—James A. Quinton

(57) ABSTRACT

The invention relates to an improved harmonic laser which provides an externally generated harmonic beam. According to the invention, a third harmonic laser or higher harmonic laser is provided. The laser includes a first reflector and a second reflector for fundamental beam, forming a resonator cavity having an optical axis. The resonator includes a laser medium for producing a fundamental beam. The first reflector is highly reflective for fundamental beam. The second reflector is at least partially reflective for fundamental beam. A second harmonic generator is located within the resonator formed between the first high reflector and the second reflector for generating a second harmonic beam from the fundamental beam. Preferably the second harmonic generator is located so that the fundamental beam makes a first and second pass through the second harmonic generator. The resonator produces two output beams at least one of which is a harmonic beam. One or more output couplers are provided to remove at least a portion of the output beams. A third harmonic or higher generator is positioned external to the resonator cavity and is located along the optical path from the output coupler, so that the output beams from the resonator incidents on the third harmonic or higher generator where portions of the output beams are converted to third harmonic or higher beam.

17 Claims, 4 Drawing Sheets

EXTERNAL 3RD, 4TH AND 5TH HARMONIC LASER

This application is a continuation-in-part of Ser. No. 09/741,137 filed Dec. 19, 2000 now U.S. Pat. No. 6,587,487.

TECHNICAL FIELD

The field of the invention concerns harmonic lasers, and in particular a method and apparatus for generating frequency tripled and higher harmonic laser beams.

BACKGROUND OF THE INVENTION

Optical harmonic generation is well known in the art. Intracavity second harmonic generators are known. See for example, J. M. Y. Yarborough, et al., "Enhancement of Optical Second Harmonic Generation by Utilizing the Dispersion of Air", Vol. 18, No. 3., *Applied Physics* p. 70–73. Third harmonic generators are also known in the art. Generally, third harmonic generation requires the generation of a second harmonic beam. External third harmonic lasers, where a second harmonic nonlinear crystal and a third harmonic nonlinear crystal are located outside the cavity, are known in the art, see for example U.S. Pat. No. 5,835,513. Intracavity third harmonic lasers are also known, See: U.S. Pat. Nos. 5,898,717. Fourth and fifth harmonic generators are also known. It is desired to provide improved external third, fourth and/or fifth harmonic generation efficiency.

SUMMARY OF THE INVENTION

The invention relates to an improved harmonic laser which provides an externally generated third, fourth and/or fifth harmonic beam. According to the invention, a third harmonic laser or higher harmonic laser is provided. The laser includes a first reflector and a second reflector for fundamental beam, forming a resonator cavity having an optical axis. The resonator includes a laser medium for producing a fundamental beam for example, Nd:YAG, Nd:YLF, Nd:YV04. The first reflector is highly reflective for fundamental beam. The second reflector is at least partially reflective for fundamental beam. A second harmonic generator is located within the resonator formed between the first high reflector and the second reflector for generating a second harmonic beam from the fundamental beam. Preferably the second harmonic generator is located so that the fundamental beam makes a first and second pass through the second harmonic generator. The resonator produces two output beams at least one of which is a harmonic beam. One or more output couplers are provided to remove at least a portion of the output beams. A third harmonic or higher generator is positioned external to the resonator cavity and is located along the optical path from the output coupler, so that the output beams from the resonator incidents on the third harmonic or higher generator where portions of the output beams are converted to third harmonic or higher beam.

When the fourth and fifth harmonic generation are required, it is preferable to include a third harmonic generator within the resonator cavity along with the second harmonic generator to produce a third harmonic beam within the cavity. Desirably, in the fourth harmonic laser according to the invention, the third harmonic and fundamental beams will be removed from the cavity through one or more output couplers and directed to an external fourth harmonic generator. Desirably, in the fifth harmonic laser, second and third harmonic beam will be removed from the cavity through one or more output couplers and directed through an externally located fifth harmonic generator.

In operation, the laser material is pumped by the pump source, for example a laser diode bar or laser diode until the laser material lases. The fundamental beam is directed across the second harmonic generator, preferably a second harmonic nonlinear crystal located within the cavity. Preferably, the crystal is located such that the fundamental beam makes a second pass across the crystal. Thus, fundamental and second harmonic beam are present in the cavity. Optionally, a third harmonic crystal can be placed in the cavity depending on whether a third harmonic, fourth harmonic or fifth harmonic beam is ultimately desired. A third, fourth or fifth harmonic generator is located external to the cavity. Within the cavity there are at least two beams present, at least one of which is a harmonic beam. Two beams are removed from the cavity through one or more outlet couplers and then are directed through an externally located harmonic generator for generation of a third harmonic beam or higher. Desirably, the beams directed outside the cavity to the external harmonic generator, have a predetermined ratio to one another.

It is an object of the invention to provide an efficient external cavity third harmonic generation laser.

It is an object of the invention to provide efficient external cavity third harmonic generation laser with a second harmonic generator located in the laser cavity and a third harmonic generator located external to the cavity.

It is an object of the invention to provide an efficient external cavity fourth or fifth harmonic generation laser with a second and third harmonic generator located in the laser cavity.

It is an object of the invention to provide an efficient external cavity fifth harmonic generation laser with a second, third and fourth generator located in the laser cavity and fifth harmonic generator located external to the cavity.

Other and further objects will become apparent from the appended specification drawing and claims. It should be understood that there are numerous embodiments contemplated by the subject invention. Every embodiment of the invention does not necessarily achieve every object of the invention.

The preferred embodiment of the present invention is illustrated in the drawings and examples. However, it should be expressly understood that the present invention should not be limited solely to the illustrative embodiment.

DETAILED DESCRIPTION OF THE INVENTION

Figure 1:
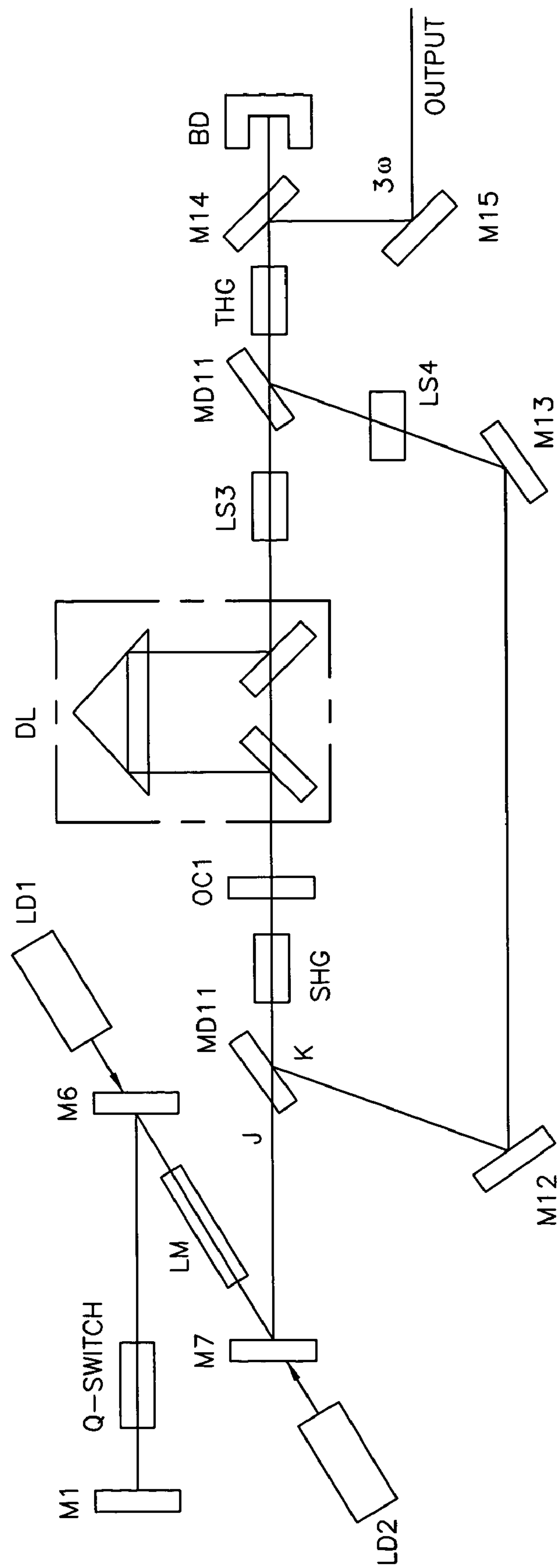
FIG. 1 is a diagrammatic view of a third harmonic laser according to the invention.

The invention relates to an improved harmonic laser which provides an externally generated third, fourth and/or fifth harmonic beams. According to the invention, a third harmonic laser or higher harmonic laser is provided. The laser includes a first reflector and a second reflector for fundamental beam, forming a resonator cavity having an optical axis. The resonator includes a laser medium for producing a fundamental beam. Desirably, the laser medium is Nd:YAG, Nd:YLF, Nd:YV04, although other laser mediums are also contemplated such as Ti:sapphire, Nd:YAB and the like. The laser medium can be pumped by any desired pumping source for example, laser, laser diode, laser diode bar, fiber coupled laser diode bar or lamp which are well known in the art. The laser medium can be either end pumped or side pumped which are well known. The first reflector is highly reflective for fundamental beam. The second reflector is at least partially reflective for fundamental beam.

A second harmonic generator is located within the resonator formed between the first high reflector desirably highly reflective for fundamental and the second reflector for generating a second harmonic beam from the fundamental beam. Preferably the second harmonic generator is located so that the fundamental beam makes a first and second pass through the second harmonic generator. Desirably the second harmonic generator is a nonlinear crystal such as LBO, BBO, KTP, CLBO or other suitable second harmonic generation nonlinear medium. The second harmonic generator desirably a crystal can be critically phase matched (CPM) or non-critical phase matched (NCPM). LBO nonlinear crystal is useful in the subject invention. The LBO crystal can be cut for noncritical phase match (NCPM) where there is substantially no walk off between the fundamental and second harmonic beams, or critical phase match (CPM) where there is walk off between the fundamental and the second harmonic beams. Depending on the particular circumstance, one or both can be used to generate the second harmonic. In general, if the laser beam spot size is substantially larger than the walk off, then either approach can be used (CPM or NCPM), if the laser beam spot size is comparable in size as compared with the walk off displacement, then, NCPM method is preferred. Walk off is proportional to the nonlinear crystal length, and second harmonic conversion efficiency is directly related with the peak power density of the fundamental beam and the effective interaction length of the crystal. Thus, in low peak power situations, NCPM method is favored.

The resonator produces two output beams at least one of which is a harmonic beam. One or more output couplers are provided to remove at least a portion of the output beams from the cavity. Optionally, an output coupler may also serve as the second reflective surface. A third harmonic or higher harmonic generator is positioned external to the resonator cavity and is located along the optical path from the output coupler or couplers, so that the output beams from the resonator simultaneously incident on the third harmonic or higher generator where portions of the output beams are converted to third harmonic or higher harmonic beam.

When fourth and fifth harmonic generation are required, it is desirable to include a third harmonic generator within the resonator cavity along with the second harmonic generator to produce a third harmonic beam within the cavity. Desirably, in the fourth harmonic laser according to the invention, the third harmonic and fundamental beams will be removed from the cavity through one or more output couplers and directed to an external fourth harmonic generator. Desirably, in the fifth harmonic laser, second and third harmonic beam will be removed from the cavity through one or more output couplers and directed through an externally located fifth harmonic generator.

In operation, the laser material is pumped by the pump source, for example a laser diode bar or laser diode until the laser material lases. The fundamental beam is directed across the second harmonic generator, preferably a second harmonic nonlinear crystal located within the cavity. Preferably, the crystal is located such that the fundamental beam makes a first and second pass across the crystal. Thus, fundamental and second harmonic beam are present in the cavity. Optionally, a third harmonic crystal can be placed in the cavity depending on whether a third harmonic, fourth harmonic or fifth harmonic beam is ultimately desired. A fourth harmonic crystal can be included in the cavity when the fifth harmonic beam is desired. A third, fourth or fifth harmonic generator is located external to the cavity. Within the cavity there are at least two beams present, at least one of which is a harmonic beam. Two beams are removed from the cavity through one or more outlet couplers and then are directed through an externally located harmonic generator for generation of a third harmonic beam or higher. Desirably, the beams directed outside the cavity to the external harmonic generator, have a predetermined ratio to one another.

In another aspect of the invention, a fourth harmonic laser is provided. The fourth harmonic crystal is located external to the resonator cavity. The fourth harmonic generator is desirably a nonlinear crystal cut for fourth harmonic generation 1$w$+3$w$. Preferably, a LBO crystal, optionally a KDP, BBO, CLBO and KD*P crystal cut for fourth harmonic generation 1$w$+3$w$ can also be used.

In operation the third harmonic laser is operated. The beams propagating from the third harmonic generator, desirable the fundamental beam 1$w$ and third harmonic beam 3$w$ are directed through fourth harmonic generator where a portion of the 1$w$ and 3$w$ beams are converted to fourth harmonic beam (4$w$). In prior art devices, the fourth harmonic generation is often achieved using a BBO crystal cut for 2$w$+2$w$. However, it is desirable to use a LBO crystal which has a larger acceptance angle and less UV absorption at 266 mm. However, the LBO crystal is only available in 1$w$+3$w$. Thus according to the invention an external fourth harmonic generation laser is provided using a LBO crystal as the fourth harmonic generator.

Figure 2:
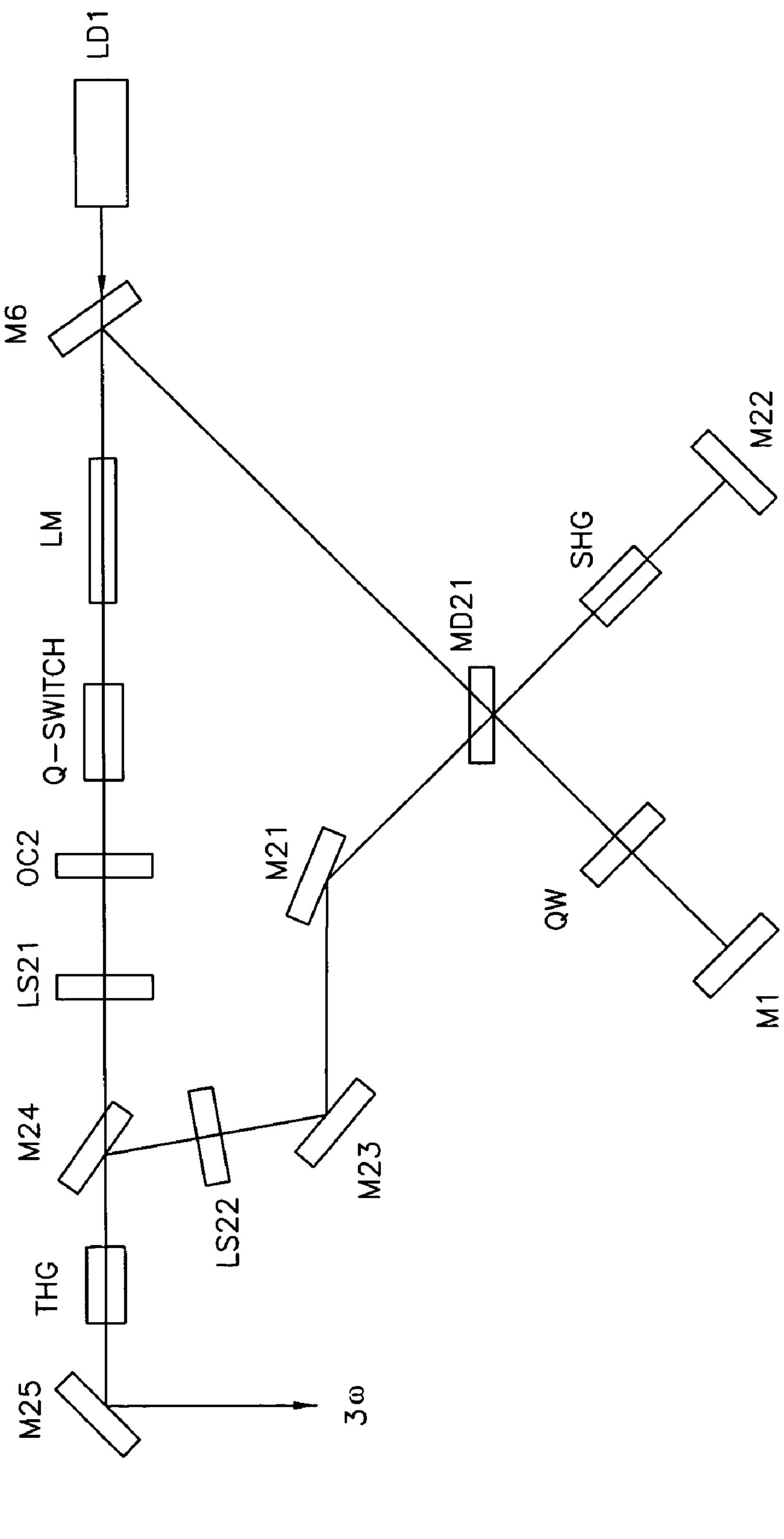
FIG. 2 is a diagrammatic view of a third harmonic laser according to the invention.

In operation of the fourth harmonic laser, a laser providing both third harmonic and fundamental beam is operated. The third harmonic beam can be generated either in the cavity as shown in FIG. 2 or externally as shown in FIG. 1. Desirably, the third harmonic beam is generated within the cavity as shown for example in FIG. 2.

In the third harmonic laser according to the invention, the second reflector is desirably partially reflective for fundamental beam and partially transmissive for fundamental beam and thus acts as one of the output couplers. Second harmonic beam and a portion of fundamental beam are removed through one or more output couplers. Desirably the fundamental beam output coupler is about 1% to about 25% preferably about 2 to 10% transmissive for fundamental beam. The percentage of transmission of fundamental beam of the output coupler is selected to provide the preselected power ratio of the second harmonic to the fundamental preferably a power ratio of about 2:1. The fundamental beam and the second harmonic beam incident on the third harmonic generator preferably in a power ratio of second harmonic to fundamental of about 2:1.

A third harmonic generator is located external to the resonator cavity in optical communication with the second harmonic beam and fundamental beam propagating from one or more output couplers. The third harmonic generator according to invention is desirably a third harmonic nonlinear crystal for example LBO, BBO, or CLBO. Optionally, other nonlinear generators can be used. Desirably the third harmonic generator for example a nonlinear crystal such as LBO has been oriented to at least partially compensate for walkoff when a CPM second harmonic crystal is used in the second harmonic generation.

Referring now to the drawings, a third harmonic generator according to the invention is shown in FIG. 1. A resonator cavity is formed between a first reflective surface preferably mirror M1 which is preferably highly reflective for fundamental beam and a second reflective surface desirably output coupler OC1 which is partially transmissive and partially reflective for fundamental beam and highly reflective for second harmonic beam. A laser medium LM desirably an Nd:YAG, Nd:YLF and Nd:$YVO_4$, is provided within the cavity. Other laser medium can be substituted. Desirably, Nd:$YVO_4$ Nd:YAG, Nd: YLF laser medium lasing at 1064NM is provided. An optional Q-switch QS can be is provided within the cavity.

Laser diodes LD1 and LD2 are provided to excite the laser medium LM. Mirrors M6 and M7 are provided on either side of the laser medium along the optical axis. M6 and M7 are highly reflective for fundamental beam and highly transmissive for the wavelength of the pumping source LD1 and LD2. A second harmonic generator SHG, desirably an LBO or BBO second harmonic generation crystal is provided within the cavity. A second harmonic output coupler is provided along the optical axis between the second harmonic generator and the laser medium, preferably a dichoric mirror MD11 which is highly reflective on side K for a second harmonic beam and highly transmissive on both sides K and J for a fundamental beam. Mirror M12 which is highly reflective for second harmonic beam is located in optical communication with MD11 and receives second harmonic beam reflected by dichoric mirror MD11. Mirror M13 which is highly reflective for a second harmonic beam is located in optical communication with mirror M12 and reflects the second harmonic beam through beam shaping optics LS4. Beam shaping optics LS4 is located in optical communication with mirror M13. LS4 can be one or more lenses, mirrors, prisms or any other beam shaping optics to optimize the shape of the second harmonic beam prior to it incidenting on the third harmonic crystal. A dichoric mirror MD12 is provided in optical communication with beam shaping optics LS4. Beam shaping optics LS3 is provided in optical communication with output coupler OC1 and dichoric mirror MD12 to focus the fundamental beam. Dichoric mirror MD12 is highly transmissive for fundamental beam propagating from LS3 and highly reflective for second harmonic beam propagating from beam shaping optics LS4. An optional optical delay line DL is provided. The optical delay line DL includes a prism PR and mirrors M60 and M61. M60 and M61 are highly reflective for fundamental beam. The delay line DL is used desirably when the laser is operated in pulsed mode with very short pulses such as pico or fem second pulses where the optional delay line makes multiple laser pulses overlap in the nonlinear generator. External to the laser cavity and located along the optical path of the second harmonic and the fundamental beam propagating from dichoric mirror MD12 is a third harmonic generator. The third harmonic generator according to the invention is desirably a third harmonic nonlinear crystal for example LBO, BBO, or CLBO. Optionally, other nonlinear generators can be used. Desirably, the third harmonic generator for example a nonlinear crystal such as LBO has been oriented to at least partially compensate for walkoff when a CPM second harmonic crystal is used in the second harmonic generation. A beam separator, for example a prism or dichoric mirror, desirably dichoric mirror M14 is provided in optical communication with the beams propagating from the third harmonic crystal THG. Mirror M14 is highly reflective for third harmonic and preferably highly transmissive for fundamental and second harmonic. Optionally, a beam block BD is provided to receive and block beams transmitted through mirror M14. The beams reflected by mirror M14 are directed to mirror M15 which is highly reflective for third harmonic and reflects the third harmonic beam as the output of the laser device. Optionally, the output can be taken directly from THG or from M14.

In operation, the laser medium LM is pumped by laser diodes LD1 and LD2. The fundamental beam from the laser medium is reflected by mirror M7 to dichoric mirror MD11 which is highly transmissive for fundamental beam. There the fundamental beam is directed through second harmonic generator SHG where a portion of the fundamental beam is converted to second harmonic beam. Output coupler OC1 which is partially reflective for fundamental beam reflects a portion of the fundamental beam back across the second harmonic generator where additional second harmonic beam is generated from the fundamental beam. Mirror MD11 transmits any unconverted fundamental beam back to mirror M7 and back across laser medium for amplification. Second harmonic beam propagating from SHG is directed outside the cavity by the output coupler, dichoric mirror MD11. The beam is then reflected by mirror M12 to mirror M13 and directed across beam shaping optics LS4 to dichoric mirror MD12 where the second harmonic beam is reflected through the third harmonic generator THG. Output coupler OC1 is partially transmissive for fundamental beam. Desirably, the output coupler OC1 is about 1% to about 25% preferably about 2% to 10% transmissive for fundamental beam. The percentage of transmission of the output coupler is desirably selected to provide the preselected power ratio of the second harmonic to the fundamental preferably a power ratio of about 2:1 as the beam ultimately propagates across third harmonic generator THG. Fundamental beam propagating from OC1 is either directed directly to lens shaping LS3 or optionally is directed to the optical delay line DL which is composed of mirror M60, M61 and prism PR. The optical delay line DL reflects fundamental beam at M60 to prism PR where the beam is transmitted to mirror M61 and then reflected across beam shaping optics LS3 to mirror MD11 which transmits fundamental beam along the same path as the reflected second harmonic beam through the third harmonic generator THG. Third harmonic beam is then efficiently produced in third harmonic generator THG.

Third, second and fundamental beam propagating from THG are directed from beam separator desirably mirror M14 which reflects third harmonic beam as the output. Optionally, mirror M15 which is highly reflective for third harmonic beam can be used to direct the output of the beam as desired. Fundamental beam and second harmonic beam are desirably transmitted by M14 to beam block BD where they are absorbed.

Referring now to FIG. 2, a third harmonic laser according to the invention is shown. A resonator cavity is provided between mirror M1 which is highly reflective for fundamental beam and output coupler OC2 which is partially reflective and partially transmissive for fundamental beam. Within the laser cavity is a laser medium LM as described above. An optional Q-switch, QS can be within the resonator cavity. A laser pumping source is provided desirably laser diode LD1 for exciting the laser medium LM. Mirror M6 is provided which is highly reflective for fundamental beam and highly transmissive for pump wavelength beam. Dichoric mirror MD21 is provided in optical communication with fundamental beam reflected from mirror M6. Dichoric mirror MD21 acts as an output coupler to remove second harmonic beam from the cavity. MD21 is highly transmissive for second harmonic beam and partially transmissive and partially reflective for fundamental beam. A reflecting mirror M22 is provided in optical communication with dichoric mirror MD21. M22 is reflective preferably highly reflective for second harmonic and fundamental beams. A second harmonic crystal SHG is located intermediate to reflecting mirror M22 and output coupler MD21. A quarter waveplate is provided intermediate to mirror M1 and output coupler MD21. Mirrors M21 and M23 are provided in optical communication with MD21. Both M21 and M23 are highly reflective for second harmonic beam. Mirror M21 reflects second harmonic beam transmitted by MD21 to mirror M23. Mirror M23 reflects second harmonic beam to beam shaping optics LS22 which is located in optical communication with M23 and mirror M24. The lens shaping optics is as described in FIG. 1. Mirror M24 is highly reflective for second harmonic and highly transmissive for fundamental beam. A third harmonic generator THG is located outside the cavity in optical communication with M24 on one side. The opposite side of THG is in optical communication with mirror M25 which reflect the third harmonic beam to a desired position for end use. Output coupler OC2 is provided between laser medium LM and mirror 24. Beam shaping optics LS21 is provided between OC2 and M24 in optical communication with both OC2 and M24 to shape fundamental beam prior to its incidenting on the third harmonic generator THG.

In operation, laser diode LD1 pumps laser material LM through mirror M6. Fundamental beam propagating from laser material LM is propagates to mirror M6 and to output coupler OC2. Mirror M6 which is highly reflective for fundamental beam and highly transmissive for pump wavelength beam, reflects fundamental to dichoric mirror MD21. The fundamental beam (I) reflected by M6 incidents on MD21. MD21 is highly transmissive for "P" polarized fundamental beam on both sides, highly reflective for "S" polarized fundamental beam for (1), and highly transmissive for "P" polarized second harmonic beam. After MD21, horizontally polarized "I" passes through quarter waveplate QW where the linear polarized "I" becomes circular polarized beam and is reflected back from M1. After passing through QW again, the polarization of "I" becomes vertical polarized and is reflected by MD21 to SHG where a portion of the vertical polarized "I" converts to SHG which is horizontal polarized. The SHG and the vertical polarized "I" are reflected back from M22 which is highly reflective for both "I" and second harmonic then passes through SHG where another portion of the "I" becomes SHG. The "I" reflected by MD21 then passes through QW and then passes QW again after reflecting by M1. After "I" exits from QW again, the "I" becomes horizontal polarized beam, is then transmitted by MD21 and reflected by M6 through LM for further amplification.

The second harmonic beam transmitted by MD21 is reflected by mirror M21 and directed to mirror M23 which reflects it through beam shaping optics LS22 to mirror M24 where it is reflected through the third harmonic generator THG which is located on the output path of both the second harmonic and the fundamental beam propagating from the resonator. Third harmonic beam propagates from THG mirror M25 which reflects the beam as the output.

Figure 3:
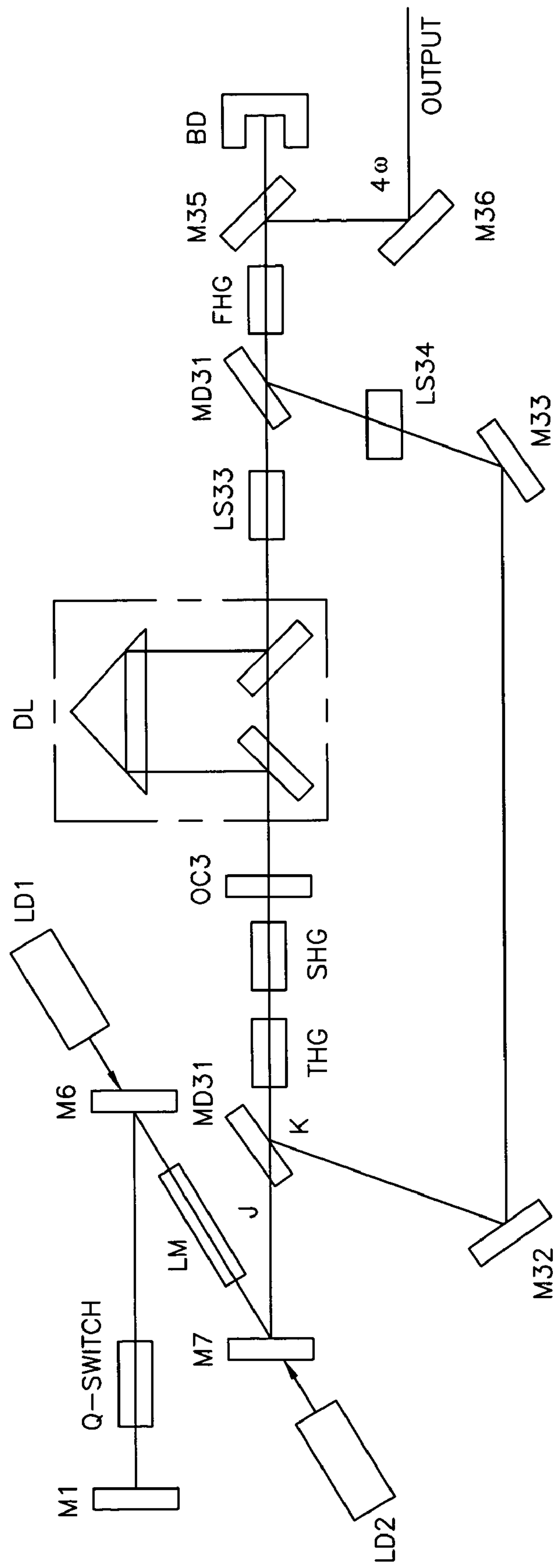
FIG. 3 is a diagrammatic view of a fourth harmonic laser according to the invention.

FIG. 3, illustrates a fourth harmonic generation apparatus according to the invention. A resonator cavity is formed between reflecting surfaces preferably mirror M1 which is highly reflective for fundamental beam and output coupler OC3 which is highly reflective for second harmonic beam and partially reflective and partially transmissive for fundamental beam. In optical communication with mirror M1 and output coupler OC3 is laser medium LM. The laser medium is preferably diode pumped by laser diode LD1 and LD2 through mirrors M6 and M7. Within the resonator cavity is located second harmonic generation crystal SHG and third harmonic generator THG. An output coupler, preferably dichoric mirror MD31 is provided in the resonator cavity along the optical axis between the laser medium on one side and the second and third harmonic generators on the other side. Third harmonic output coupler preferably dichoric mirror MD31 is highly reflective for third harmonic beam on side K and highly transmissive for fundamental beam on both sides K and J. An optional delay circuit is provided in optical communication with beam transmitted by OC3 as described with regard to in FIG. 1.

Mirror M32 which is highly reflective for third harmonic beam is in optical communication with reflected beam from side K of MD31. Mirror M33 is highly reflective for third harmonic beam and is in optical communication with mirror M32. Beam shaping optics LS34 desirably, lenses, mirrors or prisms is provided to optimize the shape of the third harmonic beam prior to its incidenting on the dichoric mirror MD32. Dichoric mirror MD21 is highly reflective for third harmonic on side L and highly transmissive for fundamental beam on side M. Beam shaping optics LS33 is provided in communication with fundamental beam propagating from OC3 to shape the fundamental beam propagating from output coupler OC3. LS33 is desirably lenses, mirrors or prisms to optimize the shape of the fundamental beam.

Fourth harmonic generator FHG is located along the optical path of both the third harmonic and fundamental beam propagating from dichoric mirror MD31 outside the laser cavity so that both third harmonic and fundamental beam pass through FHG simultaneously. Fourth harmonic generator FHG is preferably a fourth harmonic nonlinear crystal for fourth harmonic generation W+3W. The fourth harmonic generator is desirably a nonlinear crystal for generation of fourth harmonic beam from fundamental and third harmonic beam. Preferably, a LBO nonlinear crystal is used. The LBO nonlinear crystal for **1*w*+3*w* generation of fourth harmonic beam is particularly desirable because it has a large acceptance angle and has a low UV absorption at 266 nm compared with BBO crystal. Optionally, a BBO nonlinear crystal or other nonlinear crystal for generation of fourth harmonic from 1*w*+3*w*** can be used. Other optional nonlinear crystals include KDP, CLBO and KD*P. Mirror M35 is desirably provided in optical communication with beams propagating from the fourth harmonic generator and is highly reflective for fourth harmonic beam and transmissive for fundamental beam. Beam block BD is optionally provided to block any beams propagating through M35. Mirror M36 which is highly reflective for fourth harmonic beam is provided to direct the output of the laser to a desired location by the user.

In operation, the laser medium LM lases upon pumping by diodes LD1 and LD2. The fundamental beam passes a third harmonic output coupler preferably dichoric mirror MD31 where it passes through third harmonic generator THG and then is directed to second harmonic generator SHG where a portion is converted to second harmonic beam. Output coupler OC3 reflects the second harmonic beam and a portion of the fundamental beam back across the second harmonic generator where a further portion of the fundamental beam is converted to second harmonic. The second harmonic and fundamental beam then propagate through third harmonic generator where a portion of the fundamental and a substantial portion of the second harmonic are converted to a third harmonic beam. Mirror MD 31 transmits fundamental beam for further amplification in laser medium LM. Third harmonic beam is reflected by MD31 to mirror M32 which reflects the third harmonic beam to mirror M33 which reflects the third harmonic beam through beam shaping optics LS34 to dichoric mirror MD32 which reflects the third harmonic beam through a fourth harmonic generator. Fundamental beam is transmitted by output coupler OC3 through the optional optical delay line DL to beam shaping optics LS33 which directs the beam to dichoric mirror MD32 which transmits the fundamental beam through the fourth harmonic generator which is located on the optical path of both the fundamental and the third harmonic beams. Fundamental and third harmonic beams pass through FHG together and are converted to fourth harmonic beam in the fourth harmonic beam generator FHG. Mirror M35 reflects fourth harmonic beam to mirror M36 which directs the fourth harmonic beam to a desired location as the output of the device.

Figure 4:
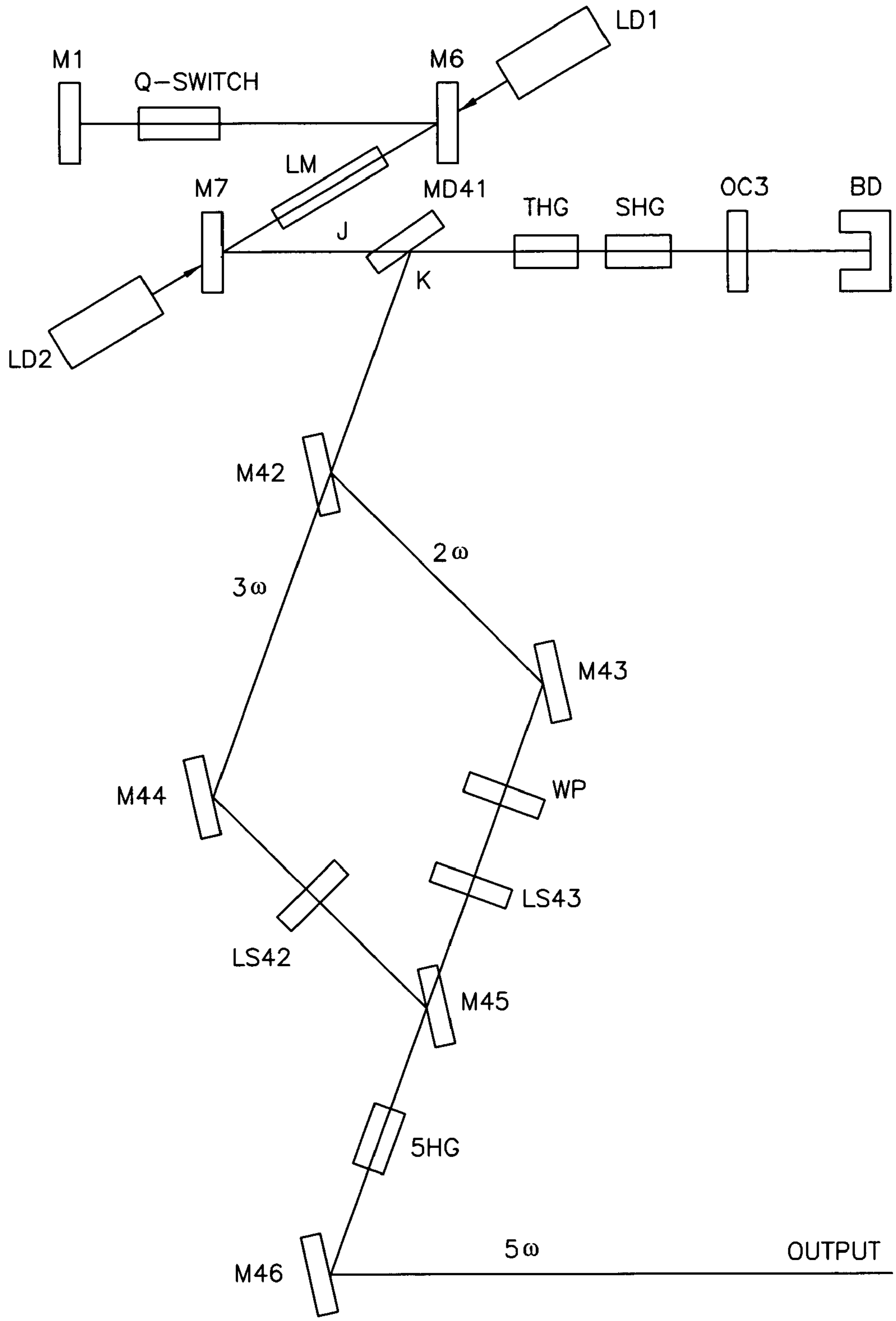
FIG. 4 is a diagrammatic view of a fifth harmonic laser according to the invention.

Referring to FIG. 4, a fifth harmonic generation apparatus is provided. A resonator cavity is formed between two reflective surfaces, preferably mirror M1 and M7. Laser medium LM is located within the resonator cavity in optical communication with mirrors M1 and M7. Within the resonator cavity is located a second harmonic generator SHG and third harmonic generator THG. Second harmonic generator SHG is located in such a way that the fundamental beam propagating from laser medium LM makes two passes across second harmonic generator prior to being returned to the laser medium for amplification. According to the invention, a fifth harmonic generator 5HG, preferably a BBO fifth harmonic generation crystal for a generation **3*w*+2*w* is provided outside the resonator cavity. Output coupler preferably dichoric mirror MD41 is provided along the optical axis between the third harmonic generator THG and the laser medium. Side K of output coupler MD41 is highly reflective for second harmonic and third harmonic beam. Dichoric mirror MD41 is highly transmissive for fundamental beam on both sides of MD41. The second harmonic and third harmonic beams are directed to mirror M42 by output coupler MD41. The BBO crystal, fifth harmonic generator, 2*w*+3*w*, requires that the second and third harmonic beams have parallel polarization. The second and third harmonic beams are orthagonally polarized when reflected by side K of MD41. Thus, the polarization of one of the beams needs to be rotated. The second harmonic and third harmonic beams are directed to mirror M42 which reflects the second harmonic and transmits the third harmonic beam. Second harmonic beam is directed to mirror M43 and is reflected to a one-half waveplate WP where the polarization is rotated 90°. Beam shaping optics LS43 is provided to shape the beam as desired prior to its incidenting on mirror M45 which is highly transmissive for second harmonic beam. Third harmonic beam is transmitted by mirror M42 and directed to mirror M44 which is highly reflective for third harmonic beam. The reflective third harmonic beam is then directed to beam shaping optics LS42. Beam shaping optics LS42 shapes the beam as desired and directs it to mirror M45 which is highly reflective for third harmonic. Fifth harmonic generation crystal, preferably a BBO fifth harmonic generation crystal 2*w*+3*w* is provided along the path of both the second harmonic and the third harmonic beams propagating from mirror M45. The second and third harmonic beams are converted to fifth harmonic beams in the fifth harmonic crystal 5HG and then directed to mirror M46** which reflects the fifth harmonic beam on a predetermined path as the output of the laser.

In operation, the laser material LM lases and the fundamental beam is directed through side J of dichoric mirror M41 through third harmonic generator to second harmonic generator where a portion of the fundamental beam is converted to second harmonic beam. The second harmonic beam and unconverted fundamental beam are reflected by mirror M22 back through second harmonic generator SHG where a further portion of the fundamental is converted to second harmonic. The second harmonic beam and the fundamental beam are then directed across the third harmonic generator where a portion of the fundamental and a substantial portion of the second harmonic are converted to third harmonic beams. Side K of output coupler, dichoric mirror M41 then reflects the second and third harmonic beams to mirror M42. The fundamental beam is transmitted by mirror MD41 and directed back across the laser medium for amplification. The second and third harmonic beams reflected by side K of MD41 are directed to mirror M42 where the second harmonic beam is reflected to M43 and the third harmonic beam is transmitted by mirror M42 and directed to mirror M44 as described above. The second and third harmonic beams then simultaneously pass through fifth harmonic generator 5HG where a portion of the beams are converted to fifth harmonic. The fifth harmonic beams propagating from 5HG are then directed by mirror M46 to a desired location for end use.

The foregoing is considered as illustrative only to the principals of the invention. Further, since numerous changes and modification will occur to those skilled in the art, it is not desired to limit the invention to the exact construction and operation shown and described above, and accordingly, all suitable modifications and equivalents may be resorted to, falling within the scope of the invention.

What is claimed is:

1. A laser for producing a third, fourth or fifth harmonic beam comprising;

a) a first reflector and a second reflector forming a resonator having an optical axis, said resonator including a laser medium for producing a fundamental beam; said first reflector highly reflective of fundamental beam;

b) a second harmonic generator located within said resonator for generating a second harmonic beam from said fundamental beam;

c) said second reflector at least partially reflective for fundamental beam;

d) said resonator producing two resonator output beams of preselected different wave length at least one of which is a harmonic beam;

e) one or more output couplers to remove at least a portion of said two output beams from said resonator and direct said removed beams on preselected optical paths outside said resonator;

f) a third, fourth or fifth harmonic nonlinear crystal located outside said resonator cavity and located along the preselected optical paths of both output beams to produce a third, fourth or fifth harmonic beam from said two output beams.

2. The laser according to claim 1 wherein said second harmonic generator is located within said resonator so that said fundamental beam makes a first and second pass across said second harmonic generator.

3. A laser according to claim 1 further comprising said one or more output couplers including a first output coupler located within said resonator to direct said second harmonic beam outside said cavity on said preselected path;

a second output coupler to direct fundamental beam outside said cavity on said preselected path;

said nonlinear crystal of paragraph f being a third harmonic nonlinear crystal;

said laser producing third harmonic beam.

4. The laser according to claim 3 wherein said third harmonic nonlinear crystal is LBO, BBO or CLBO.

5. The laser according to claim 3 wherein said second harmonic nonlinear crystal is selected from the group LBO, BBO, KTP and CLBO crystals.

6. The laser according to claim 3 wherein said second harmonic nonlinear crystal is cut for critical phase matching.

7. The laser according to claim 3 wherein said third harmonic crystal is oriented to at least partially compensate for walk off generated from the second harmonic generator.

8. The laser according to claim 3 wherein said second harmonic generator is a LBO crystal cut for critical phase matching and the third harmonic generator is a LBO crystal oriented to at least partially compensate for walk off generated from said second harmonic generator.

9. The laser according to claim 3 further comprising a focus optics system located outside of the laser cavity to focus said beams propagating from said output couplers prior to said beams incidenting on third harmonic generator.

10. The laser according to claim 3 wherein said laser medium is Nd:YAG, Nd:YLF or Nd:$YV0_4$.

11. A laser according to claim 1 further comprising;

g) a third harmonic generator located within said cavity;

h) means to direct both fundamental and second harmonic beam through said third harmonic generator to produce third harmonic beam in said cavity;

said one or more output couplers including a first output coupler located within said resonator cavity to direct third harmonic beam outside said cavity on said preselected path;

a second output coupler to direct fundamental beam outside said cavity on said preselected path;

said nonlinear crystal of paragraph f being a fourth harmonic nonlinear crystal cut for fourth harmonic generation 1*w*+3*w* said laser producing fourth harmonic beam.

12. The laser according to claim 11 wherein said second harmonic generator is located within said resonator so that said fundamental beam makes a first and second pass across said second harmonic generator.

13. The laser according to claim 12 wherein said fourth harmonic nonlinear crystal is a LBO nonlinear crystal.

14. The laser according to claim 11 wherein said third harmonic nonlinear crystal is LBO, BBO or CLBO.

15. The laser according to claim 11 wherein said second harmonic nonlinear crystal is selected from the group LBO, BBO, KTP and CLBO crystals.

16. A laser according to claim 1 further comprising;

g) a third harmonic generator located within said cavity;

h) means to direct both fundamental and second harmonic beam through said third harmonic generator to produce third harmonic beam in said cavity;

said one or more output couplers including a first output coupler located within said resonator cavity to direct third harmonic beam outside said cavity on said preselected path; a second output coupler to direct second harmonic beam outside said cavity on said preseleted path;

said nonlinear crystal of paragraph f being a fifth harmonic nonlinear crystal cut for fourth harmonic generation 2*w*+3*w;* said laser producing fifth harmonic beam.

17. A laser according to claim 1 further comprising;

g) a third harmonic generator located within said cavity;

h) a fourth harmonic generator located within said cavity;

i) means to direct both fundamental and second harmonic beam through said third harmonic generator to produce third harmonic beam in said cavity;

j) means to direct both third and fundamental beam through said fourth harmonic generator to produce a fourth harmonic beam in said cavity;

said one or more output couplers including a first output coupler located within said resonator cavity to direct fourth harmonic beam outside said cavity on said preselected path; a second output coupler to direct fundamental beam outside said cavity on said preseleted path;

said nonlinear crystal of paragraph f being a fifth harmonic nonlinear crystal cut for fourth harmonic generation 1*w*+4*w;* said laser producing fifth harmonic beam.

* * * * *